(12) United States Patent
Chen

(10) Patent No.: US 7,570,918 B2
(45) Date of Patent: Aug. 4, 2009

(54) MULTIMEDIA DEVICE FOR MOTOR VEHICLE

(75) Inventor: Mike Chen, 2F, No. 176, Jian-Yi Road, Chung-Ho City, Taipei Hsien (TW)

(73) Assignee: Mike Chen, Taipei (TW)

( * ) Notice: Subject to any disclaimer, the term of this patent is extended or adjusted under 35 U.S.C. 154(b) by 169 days.

(21) Appl. No.: 11/751,039

(22) Filed: May 21, 2007

(65) Prior Publication Data

US 2007/0281619 A1    Dec. 6, 2007

Related U.S. Application Data

(63) Continuation-in-part of application No. 11/445,318, filed on Jun. 2, 2006.

(51) Int. Cl.
*H04B 1/00* (2006.01)
*H04B 7/00* (2006.01)

(52) U.S. Cl. .................. 455/41.3; 455/42; 455/346

(58) Field of Classification Search ................ 455/41.2, 455/41.3, 42, 575.1, 575.9, 569.1, 569.2, 455/99, 345, 346; 220/737, 741; 248/311.2, 248/309.1
See application file for complete search history.

(56) References Cited

U.S. PATENT DOCUMENTS

| | | | | |
|---|---|---|---|---|
| 6,778,813 | B1 * | 8/2004 | Lilly | 455/90.3 |
| 7,140,586 | B2 * | 11/2006 | Seil et al. | 248/311.2 |
| 7,434,860 | B2 * | 10/2008 | Chen | 296/37.8 |
| 2007/0281619 | A1 * | 12/2007 | Chen | 455/42 |
| 2008/0019082 | A1 * | 1/2008 | Krieger et al. | 361/679 |
| 2008/0051160 | A1 * | 2/2008 | Seil et al. | 455/575.1 |

\* cited by examiner

*Primary Examiner*—Nguyen Vo

(57) ABSTRACT

A multimedia device comprises a host, which comprises a connection unit, a control unit for controlling connection of the connection unit to an external mobile electronic device to charge the connected mobile electronic device and to transmit multimedia music from the connected mobile electronic device to a FM channel of a car audio radio system for broadcasting, and a display unit controllable by the control unit to display the current operation status of the control unit, and a holder member coupled to the host and radially adjustable for securing the host to a cup holder for motor vehicle.

16 Claims, 6 Drawing Sheets

US 7,570,918 B2

MULTIMEDIA DEVICE FOR MOTOR VEHICLE

This application is a Continuation-In-Part of my patent application, Ser. No. 11/445,318, filed on Jun. 2, 2006.

BACKGROUND OF THE INVENTION

1. Field of the Invention

The present invention relates to a multimedia device and more particularly, to such a multimedia device, which can quickly be fastened to a cup holder in a car, and is connectable to a mobile electronic device to transmit multimedia music to the FM channel of the car audio radio system.

2. Description of the Related Art

A regular multimedia device for motor vehicle generally comprises a body and a power cord. The body is adapted to receive a mobile electronic device, for example, iPOD. The power cord extends out of the body for connection to the electric socket of the electric lighter in a car to provide the necessary working voltage to the inserted iPOD. The body has no positioning means. Vibration of the car may cause the body to fall. Therefore, the user may use a double-sided adhesive tape to affix the body to the dashboard of the car. However, it is difficult to remove the body from the dashboard after the body is affixed to the dashboard with a double-sided adhesive tape.

SUMMARY OF THE INVENTION

The present invention has been accomplished under the circumstances in view.

According to one aspect of the present invention, the multimedia device is comprised of a host and a holder member for securing the host to a cup holder in a car. The host allows connection of an external mobile electronic device by wired connection or wireless connection, and can be controlled to transmit multimedia music from the connected mobile electronic device to a FM channel of a car audio radio system.

According to another aspect of the present invention, the host comprises a control unit, a display unit and a connection unit. The control unit comprises a control circuit, and a plurality of operation keys including an on/off switch key, a channel up/down switch key, a channel memory switch key, and etc. The control circuit of the control unit controls connection of the connection unit to an external mobile electronic device to charge the connected mobile electronic device and to transmit multimedia music from the connected mobile electronic device to a FM channel of a car audio radio system for broadcasting. The display unit is controllable by the control unit to display the current operation status of the control unit.

According to still another aspect of the present invention, the holder member comprises a holder base, a gear mounted in the holder base, and a plurality of positioning devices respectively meshed with the gear and supported on a respective elastic member. When forcing one positioning device inwards toward the inside of the holder base, the gear is rotated, and all the positioning devices are synchronously moved toward the inside of the holder base for allowing insertion of the holder base into a cup holder. When released the hand from the positioning devices after insertion of the holder base into the cup holder, the positioning devices are moved outwards by the respective elastic member and stopped at the lateral side of the cup holder to secure the holder member and the host to the cup holder.

DETAILED DESCRIPTION OF THE PREFERRED EMBODIMENT

Figure 1:
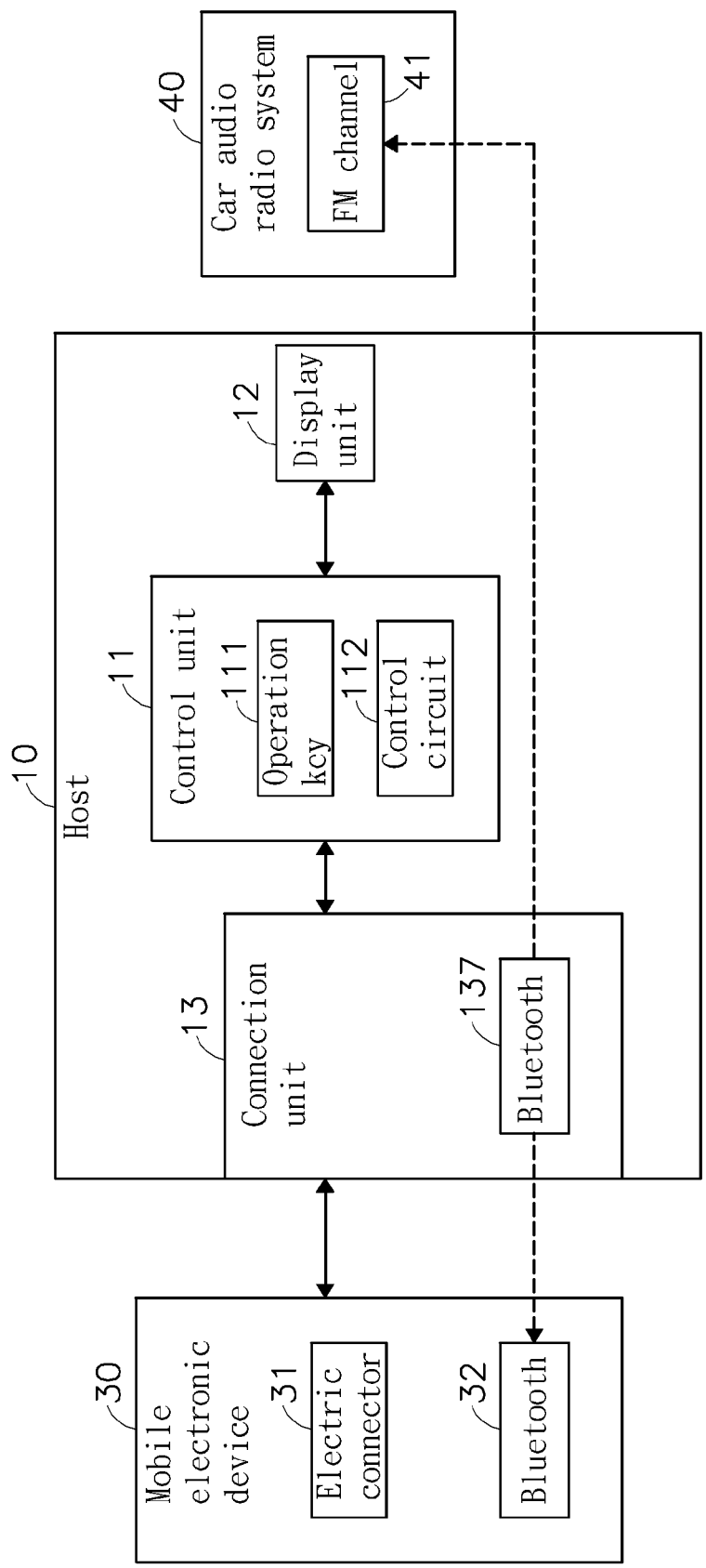
FIG. 1 is a system block diagram of a multimedia device according to the present invention.
Figure 2:
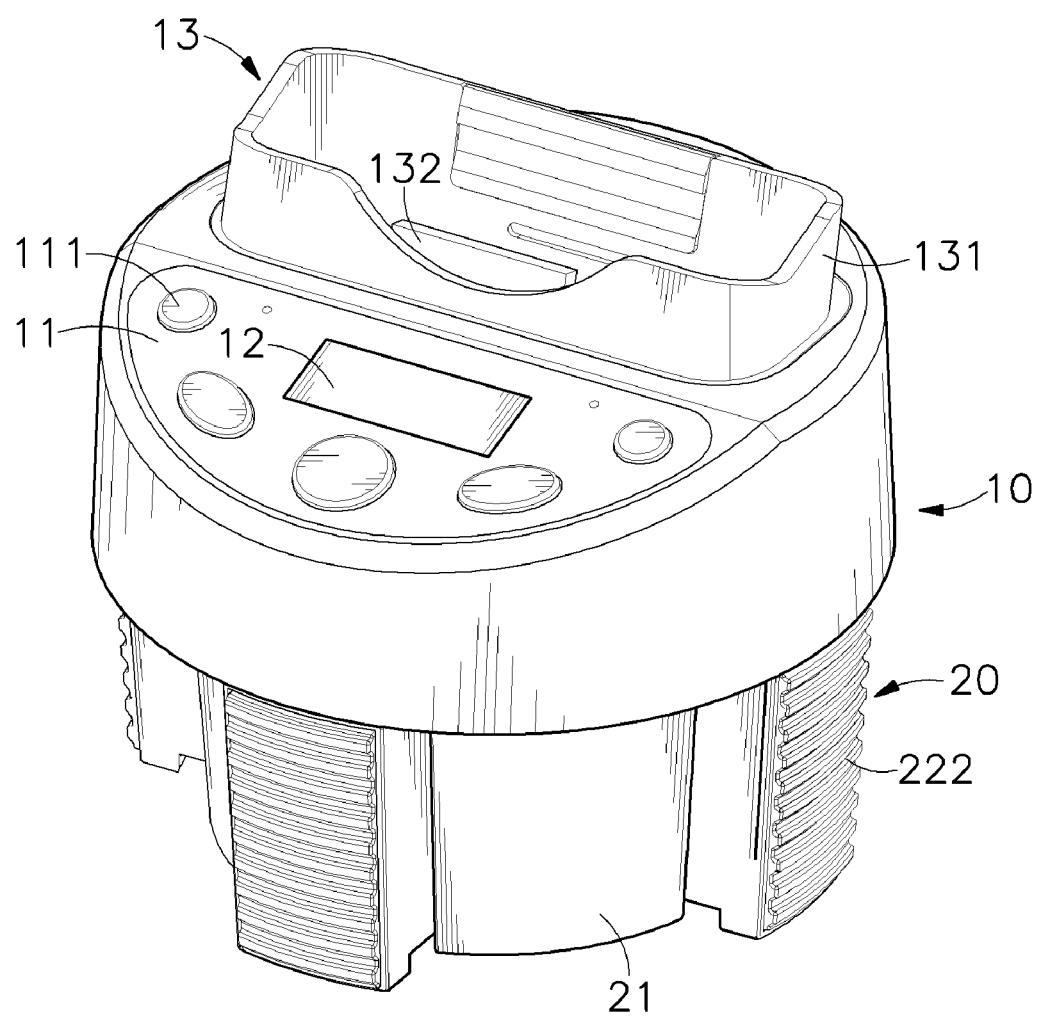
FIG. 2 is an oblique elevation of the multimedia device according to the present invention.
Figure 3:
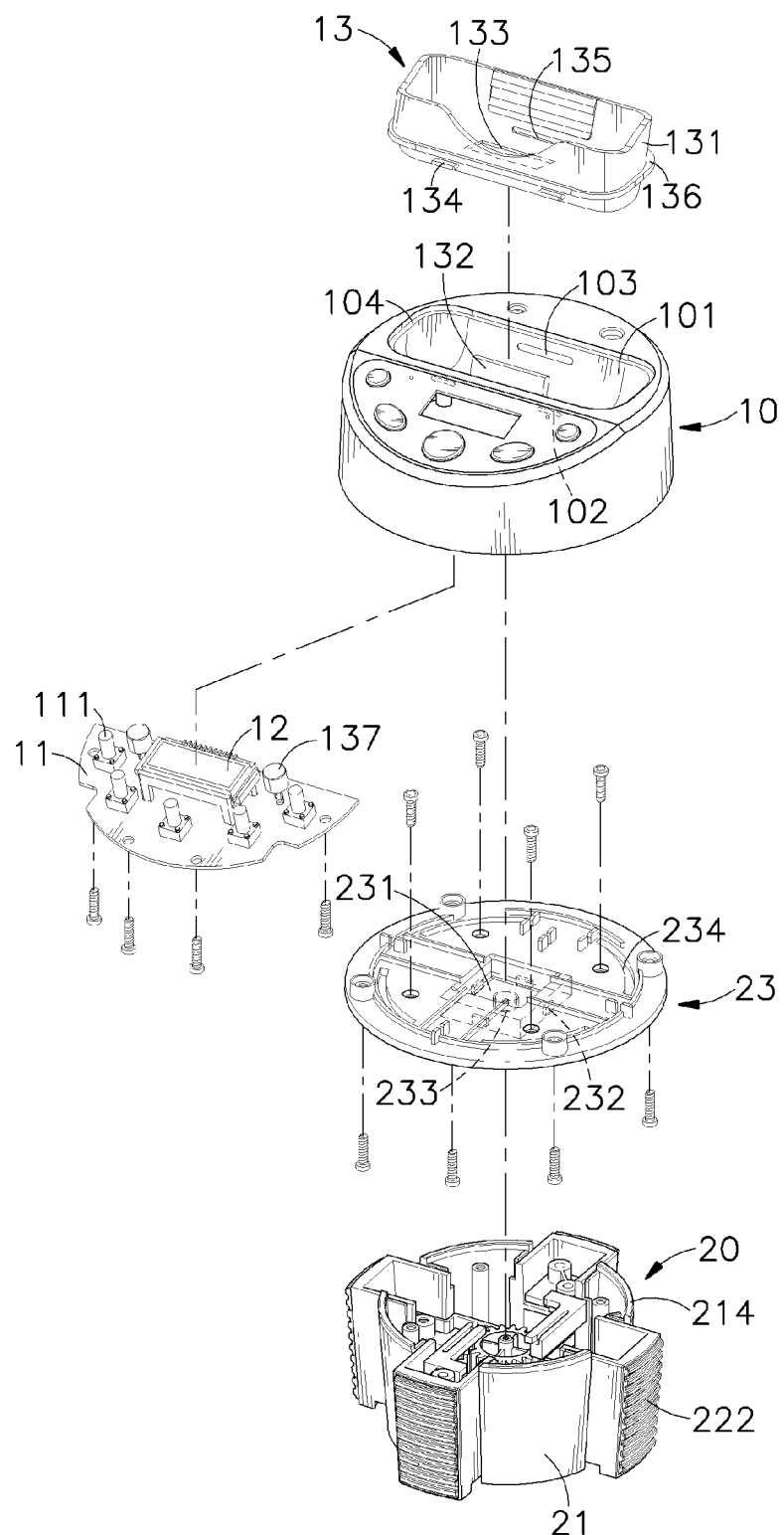
FIG. 3 is an exploded view of the multimedia device according to the present invention.
Figure 4:
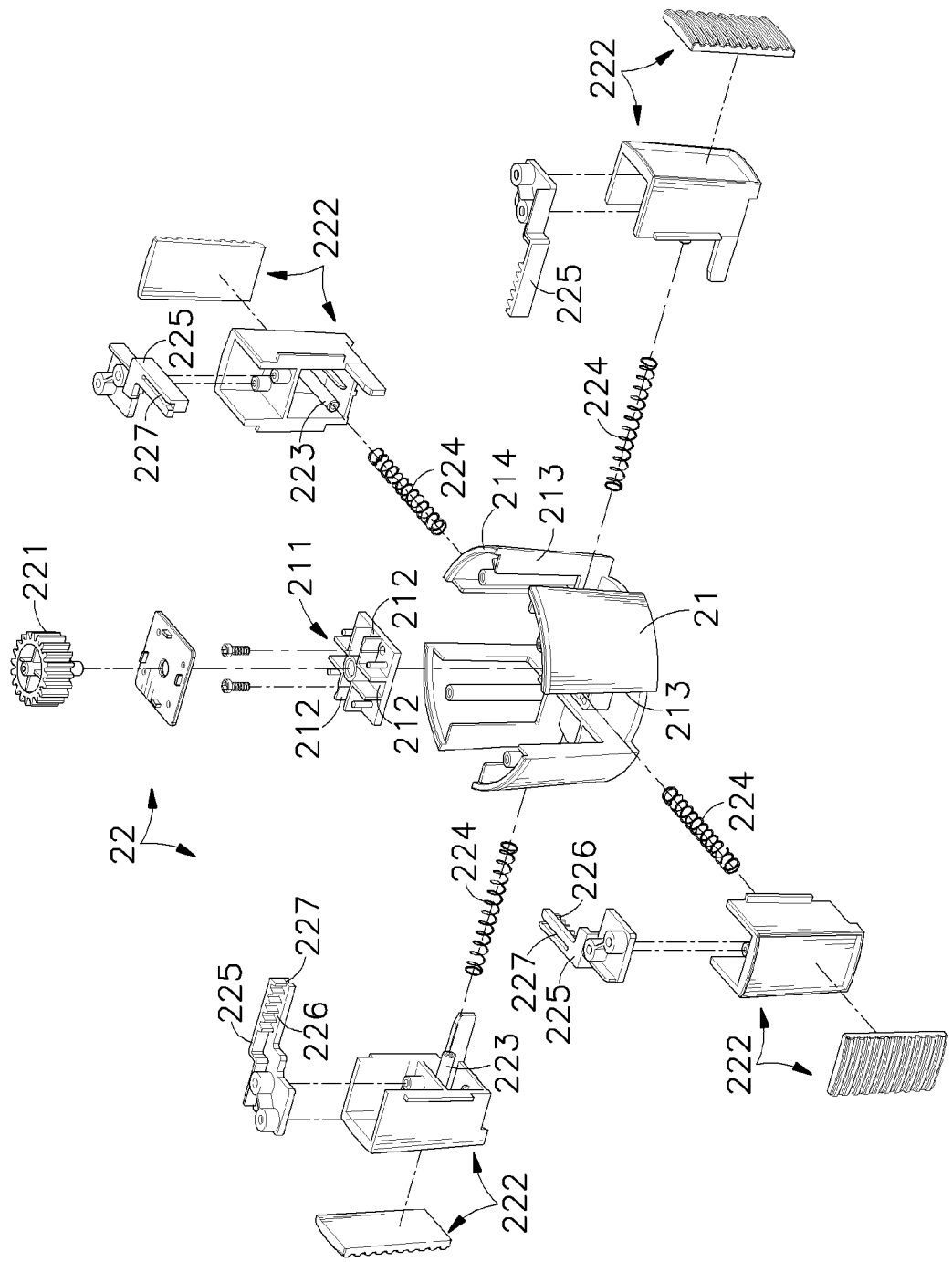
FIG. 4 is an exploded view of the holder member of the multimedia device according to the present invention.
Figure 5:
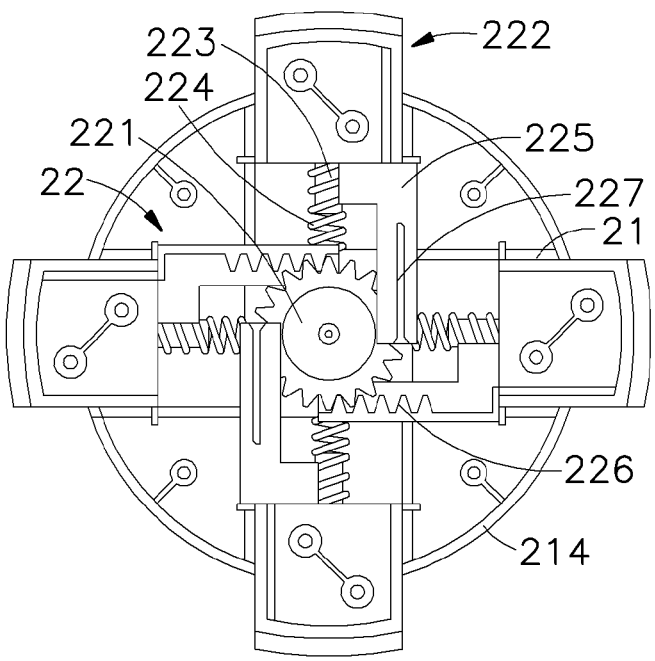
FIG. 5 is a sectional top view of the holder member of the multimedia device according to the present invention, showing extended status of the positioning devices.
Figure 6:
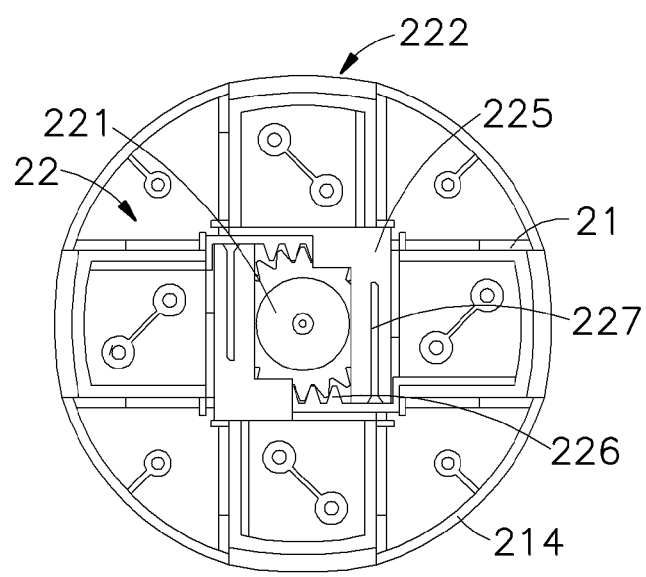
FIG. 6 is a sectional top view of the holder member of the multimedia device according to the present invention, showing received status of the positioning devices.

Referring to FIG. 1, a host 10 of a multimedia device in accordance with the present invention is shown comprising a control unit 11, a display unit 12 and a connection unit 13.

The control unit 11 comprises a set of operation keys 111 and a control circuit 112. The control unit 11 can control a bluetooth module 137 of the connection unit 13 to communicate with a bluetooth module 32 of a mobile electronic device 30 wirelessly, enabling the bluetooth module 137 to transmit multimedia music from the mobile electronic device 30 to a FM channel 41 of a car audio radio system 40 of the car carrying the host 10 and the mobile electronic device 30. Alternatively, the mobile electronic device 30 can be inserted into the host 10 to connect an electric connector 31 to the connection unit 13. The display unit 12 displays the current operation status of the control unit 11. The connection unit 13 allows for electric connection of the mobile electronic device 30, and can charge the mobile electronic device 30 or transmit multimedia music from the mobile electronic device 30 after connection of the mobile electronic device 30.

Referring to FIGS. 2~6 and FIG. 1 again, a holder member 20 is coupled to the bottom side of the host 10. The control unit 11 and the display unit 12 of the host 10 are exposed to the outside. The operation keys 111 of the control unit 11 include an on/off switch key, a channel up/down switch key, a channel memory switch key, and etc. The control circuit 112 of the control unit 11 and the bluetooth module 137 of the connection unit 13 are provided inside the host 10. The host 10 has a recessed chamber 101 on the outside, a plurality of locating holes 102 in the recessed chamber 101 at one side, a retaining portion 103 in the recessed chamber 101 at the opposite side, and a stepped locating groove 104 extending around the recessed chamber 101 at the top. The connection unit 13 comprises a receptacle 131 and an electric connector 132. The electric connector 132 is mounted in the recessed chamber 101 and electrically connected to the control circuit 112. The receptacle 131 is positioned in the recessed chamber 101, having a bottom opening 133 for receiving the electric connector 132, a plurality of locating ribs 134 protruded from one side and respectively engaged into the locating holes 102, a retaining hole 135 disposed at the opposite side for receiving the retaining portion 103, and a stepped positioning portion 136 fitting the locating groove 104.

The holder member 20 comprises a holder base 21, a positioning mechanism 22 and a cover plate 23. The holder base 21 has a locating plate 211 at the center and four equiangularly spaced peripheral openings 213. The locating plate 211 has four receiving channels 212 extending radially outwards corresponding to the four equiangularly spaced peripheral openings 213. The positioning mechanism 22 comprises a gear 221 pivotally mounted on the locating plate 211, and four positioning devices 222 arranged around the gear 221 and radially movable in and out of the peripheral openings 213. Each positioning device 222 comprises a horizontal extension bar 225, a sliding groove 227 extending along the extension bar 225 at the top, a horizontal rack 226 formed integral with one side of the extension bar 225 and meshed with the gear 221, a pin 223 disposed adjacent to the extension bar 225, and an elastic member 224, which has one end connected to the pin 223 and the other end inserted into one receiving channel 212.

The cover plate 23 is fastened to the holder base 21 to close the top open side of the holder base 21, having a bottom center block 231, a pivot hole 233 formed on the bottom side of the bottom center block 231 and coupled to the gear 221 to support rotation of the gear 221, a plurality of bottom rails 232 spaced around the bottom center block 231 and respectively coupled to the sliding groove 227, and a plurality of mounting slots 234 respectively coupled to respective top flanges 214 of the holder base 21.

Figure 7:
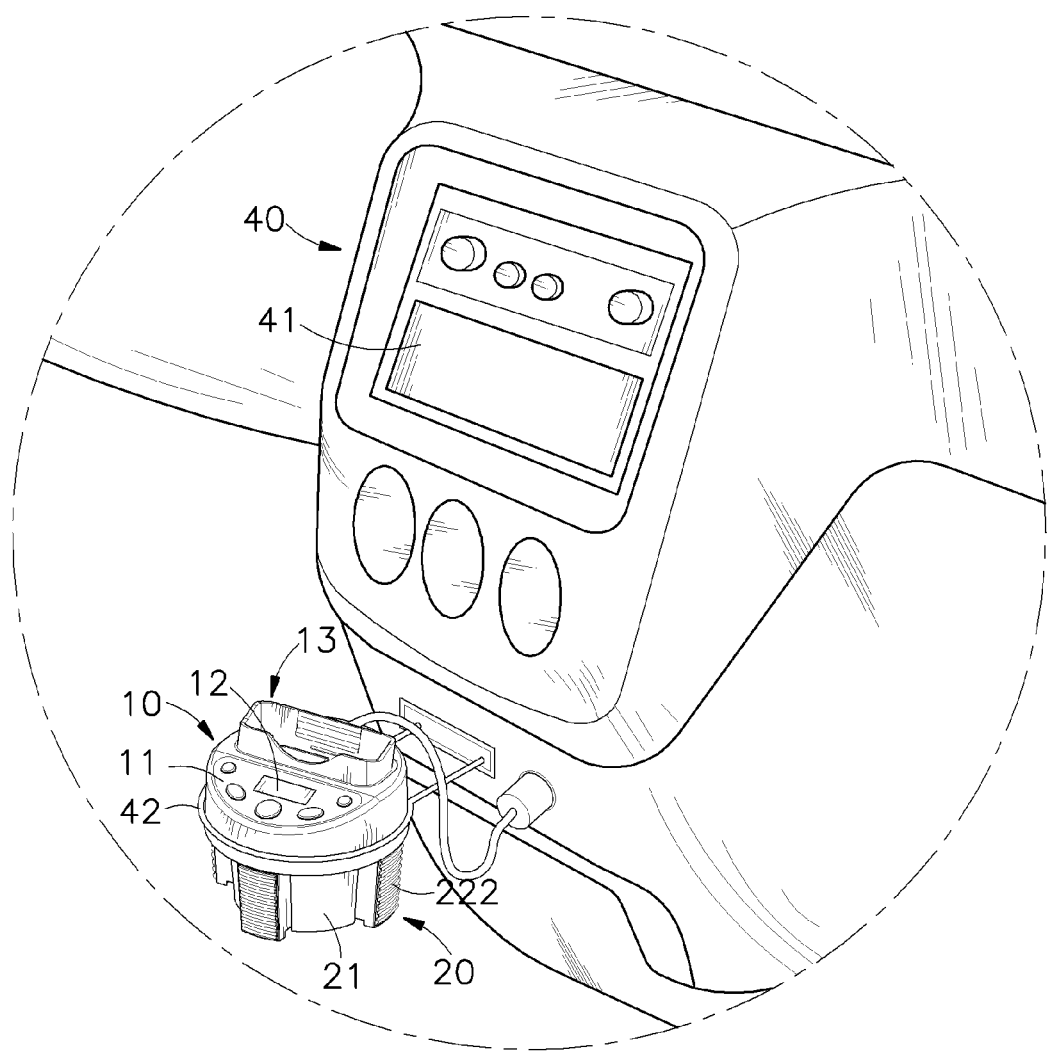
FIG. 7 illustrates an application example of the multimedia device according to the present invention.

When in use, the holder member 20 is mounted in a cup holder 42 to support the host 10 inside a car (see FIG. 7). The diameter of the holder member 20 is adjustable subject to the inner diameter of the cup holder 42. During installation, press one positioning device 222 of the holder member 20 to move the extension bar 225 along the associating bottom rail 232 toward the inside of the holder base 21, forcing the rack 226 to rotate the gear 221, and therefore the other positioning devices 222 are synchronously moved toward the inside of the holder base 21, allowing for insertion of the holder member 20 into the cup holder 42. After insertion of the holder member 20 into the cup holder 42, release the hand from the holder member 20. At this time, the elastic members 224 automatically return the positioning devices 222, and therefore the positioning devices 222 are stopped at the lateral side of the cup holder 42 to secure the holder member 20 firmly to the cup holder 42.

Referring to FIGS. 1 and 7 again, the host 10 is electrically connected to the car audio radio system 40, and the mobile electronic device 30 can be inserted into the receptacle 131 and electrically connected to the electric connector 132 for charging. At this time, the connection unit 13 can be controlled to transmit storage multimedia music from the mobile electronic device 30 to the FM channel 41 of the car audio radio system 40 for broadcasting. The user can also use the bluetooth module 137 of the connection unit 13 to communicate with any of a variety of mobile electronic devices 30 wirelessly. Through the operation keys 111 of the control unit 11, the user can switch on/off the power supply of the host 10, select FM radio station, switch memorized channel, etc. The mobile electronic device 30 can be a mobile telephone, PDA (Personal Data Assistant), iPOD, notebook computer or any of a variety of other mobile electronic devices having bluetooth function.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A multimedia device comprising:
a host, said host comprising a control unit, a display unit and a connection unit, said control unit being controllable to control connection of said connection unit to an external mobile electronic device to charge the connected mobile electronic device and to transmit multimedia music from the connected mobile electronic device to a FM channel of a car audio radio system for broadcasting, said display unit being controllable by said control unit to display the current operation status of said control unit; and
a holder member coupled to a bottom side of said host and radially adjustable for securing said host to a cup holder for motor vehicle, wherein said holder member comprises a holder base, said holder base having a plurality of openings cut through and equiangularly spaced around the periphery thereof, a locating plate fixedly mounted inside said holder base, a positioning mechanism radially movable in and out of the openings of said holder base for securing said holder member to the cup holder, and a cover plate covering on a top open side of said holder base.

2. The multimedia device as claimed in claim 1, wherein said control unit comprises a plurality of operation keys disposed outside said host and a control circuit mounted inside said host, said operation keys including a power on/off switching key, a channel up/down switch key and a channel memory switch key.

3. The multimedia device as claimed in claim 1, wherein said connection unit comprises a bluetooth module for connection to the external mobile electronic device wirelessly and transmitting multimedia music from the connected mobile electronic device to the FM channel of the car audio radio system.

4. The multimedia device as claimed in claim 1, wherein said host has a recessed chamber on an outside wall thereof; said connection unit comprises a receptacle mounted in the recessed chamber of said host for receiving the external mobile electronic device, and an electric connector electrically connected to said control unit for electrically connecting the inserted mobile electronic device in said receptacle to said control unit.

5. The multimedia device as claimed in claim 4, wherein said receptacle has a bottom opening for receiving said electric connector.

6. The multimedia device as claimed in claim 4, wherein said host comprises a plurality of locating holes in said recessed chamber at one side, a retaining portion in said recessed chamber at an opposite side; said receptacle comprises a plurality of locating ribs protruded from one side thereof and respectively engaged into the locating holes of said host, and a retaining hole disposed at an opposite side thereof and forced into engagement with the retaining portion of said host.

7. The multimedia device as claimed in claim 4, wherein said host comprises a stepped locating groove extending around a top side of said recessed chamber; said receptacle comprises a stepped positioning portion fitted into said stepped locating groove.

8. The multimedia device as claimed in claim 1, wherein said positioning mechanism comprises a gear pivotally mounted on said locating plate, and a plurality of positioning devices equiangularly spaced around said gear and respectively meshed with said gear and movable in and out of the openings of said holder base upon rotation of said gear; said cover plate comprises a bottom center block coupled to said gear to support rotation of said gear.

9. The multimedia device as claimed in claim 8, wherein said cover plate comprises a plurality of bottom rails equiangularly spaced around said bottom center block; said positioning devices each comprise an extension bar, a rack formed integral with said extension bar and meshed with said gear, and a sliding groove respectively coupled to said bottom rails of said cover plate.

10. The multimedia device as claimed in claim 9, wherein said locating plate comprises a plurality of receiving channels corresponding to said positioning devices; said positioning devices each further comprise a pin fixedly disposed adjacent to said extension bar, and an elastic member, which has one end fastened to said pin and an opposite end inserted into one receiving channel of said locating plate.

11. The multimedia device as claimed in claim 9, wherein said bottom center black of said cover plate has a pivot hole coupled to said gear to support rotation of said gear.

12. The multimedia device as claimed in claim 1, wherein said holder base comprises a plurality of top flanges; said cover plate comprises a plurality of mounting slots respectively coupled to the top flanges of said holder base.

13. The multimedia device as claimed in claim 1, wherein said external mobile electronic device is a mobile telephone.

14. The multimedia device as claimed in claim 1, wherein said external mobile electronic device is a personal data assistant.

15. The multimedia device as claimed in claim 1, wherein said external mobile electronic device is an iPOD.

16. The multimedia device as claimed in claim 1, wherein said external mobile electronic device is a notebook computer.

* * * * *